(12) United States Patent
Kakiuchi

(10) Patent No.: US 6,535,953 B1
(45) Date of Patent: Mar. 18, 2003

(54) MAGNETIC DISK, METHOD OF ACCESSING MAGNETIC DISK DEVICE, AND RECORDING MEDIUM STORING DISK ACCESS CONTROL PROGRAM FOR MAGNETIC DISK DEVICE

(75) Inventor: Tomio Kakiuchi, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 38 days.

(21) Appl. No.: 09/831,979

(22) PCT Filed: Sep. 14, 2000

(86) PCT No.: PCT/JP00/06295
§ 371 (c)(1),
(2), (4) Date: Jul. 31, 2001

(87) PCT Pub. No.: WO01/20442
PCT Pub. Date: Mar. 22, 2001

(30) Foreign Application Priority Data

Sep. 16, 1999 (JP) ............................................. 11-262714

(51) Int. Cl.$^7$ ............................................. G06F 12/00
(52) U.S. Cl. .................... 711/112; 711/111; 711/113; 711/114; 711/137; 714/9; 714/49; 360/51; 360/53; 360/62
(58) Field of Search ...................... 711/111, 112, 113, 711/114, 137; 714/9, 49; 360/51, 53, 62

(56) References Cited

U.S. PATENT DOCUMENTS 5,613,066 A * 3/1997 Matsushima et al. ......... 714/49
5,890,210 A * 3/1999 Ishii et al. .................. 711/113

FOREIGN PATENT DOCUMENTS

| JP | 61-175721 | 8/1986 |
|---|---|---|
| JP | 4-355819 | 12/1992 |
| JP | 4-366475 | 12/1992 |
| JP | 5-274089 | 10/1993 |
| JP | 6-89144 | 3/1994 |
| JP | 9-185462 | 7/1997 |
| JP | 2000-195147 | 7/2000 |

* cited by examiner

Primary Examiner—Do Hyun Yoo
Assistant Examiner—Ngoc V Dinh
(74) Attorney, Agent, or Firm—Wenderoth, Lind & Ponack, L.L.P.

(57) ABSTRACT

A magnetic disc apparatus according to the present invention is one which is provided with a host interface unit 2 which controls the interface connected to a host apparatus 1, a command administrating unit 3, a position information administrating unit 4, a control unit 5 which controls the whole operation of a magnetic disc apparatus 9, a buffer memory 6 which temporarily stores data, a read/write control unit 7 and a magnetic disc 8.

The magnetic disc apparatus thus constituted can enhance the data transmission efficiency even when accessing to plural systems of large capacity successive data are carried out.

19 Claims, 5 Drawing Sheets

MAGNETIC DISK, METHOD OF ACCESSING MAGNETIC DISK DEVICE, AND RECORDING MEDIUM STORING DISK ACCESS CONTROL PROGRAM FOR MAGNETIC DISK DEVICE

TECHNICAL FIELD

The present invention relates to a magnetic disc apparatus and, more particularly, to magnetic disc apparatus which accesses plurality of large capacity successive data, and a disc access method for the magnetic disc apparatus. Further, the invention relates to a recording medium having recorded a program for a disc access control for a magnetic disc apparatus.

BACKGROUND ART

In computer systems which perform control and administration of OA apparatuses or industrial apparatuses, accompanying with an increase in handling information data, a large capacity memory has been required for recording those information data. As a large capacity memory device satisfying such requirements, a magnetic disc apparatus employing a magnetic disc as recording medium has been widely used.

By the way, in transmitting files between a magnetic disc apparatus and a host apparatus connected externally of the magnetic disc apparatus, it is a basic operation that the magnetic disc apparatus commences access to the magnetic disc in the magnetic disc apparatus after receiving a command issued from the host apparatus.

When a command and a command parameter are transmitted at the same time from the host apparatus, the magnetic disc apparatus calculates at which position on the magnetic disc the data the host apparatus has required an access physically exists, makes the head seek a track on the magnetic disc in the magnetic disc apparatus according to the calculated result, thereby to perform reading out or writing in from/into the data required by the host apparatus.

Hereinafter, such a magnetic disc apparatus will be described, particularly on the operation thereof with reference to drawings.

FIG. 7 is a diagram illustrating an operation of the magnetic disc apparatus, and particularly, a processing performed on the magnetic disc, when the host apparatus accesses two large capacity successive data located apart from each other in the magnetic disc apparatus at the same time.

In FIG. 7, file (m−1)', m, m' and m+1 constitute a part of large capacity successive data A, and file (n−1)', n, n' and n+1 constitute a part of large capacity successive data B.

Further, file (m−1)' and file m locate on track M, file m' and file m+1 locate on track M+1, file (n−1) and file n locate on track N, and file n' and file n+1 locate on track N+1. Each file has the size that is equal to the data length which is handled at one time command by the host apparatus.

While when the host apparatus accesses a large capacity successive data, the host apparatus has only to issue commands for accessing files in chronological order of the successive files, when the host apparatus accesses two large capacity successive data at the same time, the host apparatus has to issue commands for accessing respective files in the large capacity successive data A and commands for accessing respective files in the large capacity successive data B, alternately, at a constant period (band). These commands are shown in FIG. 8.

In this case, as shown in FIG. 8, the magnetic disc apparatus interprets the content of the command each time when it receives the issued command, and calculates the positional information at which physical location the demanded data locates physically on the magnetic disc from the command parameter thereby to carry out accessing to the data on the magnetic disc.

That is, in the magnetic disc apparatus, accessing to the large capacity successive data A and accessing to the large capacity successive data B are carried out alternately and successively.

To be concrete, as shown in FIG. 7, accessing to the magnetic disc is carried out in the order of access 1 to the file m and the file m', seek 1 for executing access 2 to the file n and the file n', the access 2 to the file n and the file n', seek 2 for executing access 3 to the file m+1, the access 3 to the file m+1, seek 3 for executing access 4 to the file n+1, and the access 4 to the file n+1.

However, in the conventional magnetic disc apparatus, though accessing to files respectively constituting each of two large capacity successive data are carried out alternatively, and it is possible to predict a physical location from which accessing to data on the optical disc is started, it is impossible to start accessing to respective files until a command is issued from the host apparatus. In other words, the magnetic disc should arise an idle state in which nothing is performed to the magnetic disc during a period from the completion of an access to a file up to starting of a seek for carrying out an access to next file.

That is, when the host apparatus accesses a plurality of large capacity successive data at the same time, even though there is a high possibility of performing an access to data whose access starting position on the magnetic disc can be predicted, the magnetic disc apparatus stops accessing to the magnetic disc and enters a waiting state (the idle state) after completing the accessing to the file now being processed, and the idle state continues until a next command is received. When receiving the next command, the magnetic disc apparatus interprets the received command, calculates location information from the command parameter, and seeks the track in which data is present, and thereafter, starts accessing to the data.

In this way, when the host apparatus accesses a plurality of large capacity successive data at the same time, there should arise an idle state where no access is performed to the magnetic disc, thereby no improvement in the data transfer efficiency.

The present invention is directed to solve the above described problem, and has for its object to provide a magnetic disc apparatus which does not reduce the data transfer efficiency between the magnetic disc and a buffer memory even when accessing to plural systems of large capacity successive data are carried out, to provide a disc access method for the magnetic disc apparatus, which enables the above-described disc access, and further, to provide a recording medium having recorded a disc access control program for a magnetic disc apparatus.

DISCLOSURE OF THE INVENTION

According to a first aspect of the present invention, there is provided a magnetic disc apparatus which can read out or write into various kinds of information data by accessing a magnetic disc employed as a recording medium, wherein when a host apparatus connected externally to the magnetic disc apparatus, performs an access to each of plural systems constituting large capacity successive data, which systems are located apart from each other in the magnetic disc apparatus, the magnetic disc apparatus stores a record of commands at the same time when the host apparatus issues commands for accessing the respective systems to the magnetic disc apparatus, compares a new received command with the stored record of commands to detect continuity of commands against the respective systems every time when it receives a new command issued from the host apparatus, and preserves location information indicating physical location on the magnetic disc at which data to be accessed for each of the plural systems locate, and in which apparatus a system preserving the location information starts data accessing to the magnetic disc by employing the location information when the magnetic disc apparatus receives a command issued from the host apparatus.

According to the present invention, while accessing large capacity successive data on a magnetic disc, the time required for interpreting a command after receiving the command can be reduced, as well as the time from the completion of an access to one system to the start of an access to next system can be shortened, thereby the data transmission efficiency is enhanced.

According to a second aspect of the present invention, there is provided a magnetic disc apparatus which can read out or write into various kinds of information data by accessing a magnetic disc employed as a recording medium, wherein when a host apparatus connected externally to the magnetic disc apparatus, performs an access to each of plural systems constituting large capacity successive data, which systems are located apart from each other in the magnetic disc apparatus, the magnetic disc apparatus stores a record of commands at the same time when the host apparatus issues commands for accessing the respective systems to the magnetic disc apparatus, compares a new received command with the stored record of commands to detect continuity of commands against the respective systems every time when it receives a new command issued from the host apparatus, and seeks a magnetic head employed in data access, to a track on the magnetic disc at which data of a system which is supposed to be accessed by the next command locate, without waiting receiving of the next command when the accessing to the data on the magnetic disc at which the respective system data locate is completed.

According to the present invention, by that a seeking of a magnetic head to a track on which data which is supposed to be accesses next is carried out at the conclusion of access to data, the time from the receiving of a command to the starting of an access to the requested data while accessing a large capacity successive data on a magnetic disc is reduced, thereby the time from the completion of an access to one system to the starting of an access to the next system is shortened and the data transfer efficiency is enhanced.

According to a third aspect of the present invention, there is provided a magnetic disc apparatus which can read out or write into various kinds of information data by accessing a magnetic disc employed as a recording medium, wherein when a host apparatus connected externally to the magnetic disc apparatus, performs an access to each of plural systems constituting large capacity successive data, which systems are located apart from each other in the magnetic disc apparatus, the magnetic disc apparatus stores a record of commands at the same time when the host apparatus issues commands for accessing the respective systems to the magnetic disc apparatus, compares a new received command with the stored record of commands to detect continuity of commands against the respective systems every time when it receives a new command issued from the host apparatus, and performing data access, to a track on the magnetic disc at which data of a system which is supposed to be accessed by the next command locate, without waiting receiving of the next command when the accessing to the data on the magnetic disc at which the respective system data locate is completed.

According to the present invention, by that the data access is started by seeking a magnetic head to a track on which the data which is supposed to be accessed next exists, the time from the receiving of a command to completing the access of the requested data while accessing a large capacity successive data on a magnetic disc is reduced, thereby the time from the completion of an access to one system to the completion of an access to the next system is shortened and the data transfer efficiency is enhanced.

According to a fourth aspect of the present invention, there is provided a magnetic disc apparatus of the second aspect or the third aspect, which stops seeking of a magnetic head to a track on the magnetic disc, in which the predicted system locates, in a case where a command is issued from the host apparatus and the content of the command is not an access to data of the system that is predicted, during the seeking operation that is being performed in the magnetic disc apparatus before receiving the command from the host apparatus.

According to the present invention, in a case where a command to a supposed system is received during the seeking operation and that command is one which accesses not to the supposed system but to another system, the seeking operation to the supposed system is immediately halted, and it is transited to the interpretation of the received command to initiate an access to the requested system, thereby an increase in the access starting time to the system that is requested by the command even when prediction was erroneously performed.

According to a fifth aspect of the present invention, there is provided a magnetic disc apparatus of the third aspect which stops accessing to the data on the magnetic disc in which the supposed system exists, in a case where a command is issued from the host apparatus and the content of the command is not an access to data of the system that is predicted, during the data accessing that is being performed in the magnetic disc apparatus before receiving the command from the host apparatus.

According to the present invention, in a case where a command to a supposed system is received during the seeking operation and that command is one which accesses not to the supposed system but to another system, the accessing to the supposed system is immediately halted, and it is transited to the interpretation of the received command to initiate an access to the requested system, thereby an increase in the access starting time to the system that is requested by the command is restrained even when prediction was erroneously performed.

According to a sixth aspect of the present invention, there is provided a disc access method for a magnetic disc apparatus which apparatus can read out or write into various kinds of information data by accessing a magnetic disc employed as a recording medium, wherein when a host apparatus connected externally to the magnetic disc apparatus, performs an access to each of plural systems constituting large capacity successive data, which systems are located apart from each other in the magnetic disc apparatus, the magnetic disc apparatus stores a record of commands at the same time when the host apparatus issues commands for accessing the respective systems to the magnetic disc apparatus, compares a new received command with the stored record of commands to detect continuity of commands against the respective systems every time when it receives a new command issued from the host apparatus, and preserves location information indicating physical location on the magnetic disc at which data to be accessed for each of the plural systems locate, and in which apparatus a system preserving the location information starts data accessing to the magnetic disc by employing the location information when the magnetic disc apparatus receives a command issued from the host apparatus.

According to the present invention, while accessing large capacity successive data on a magnetic disc, the time required for interpreting a command after receiving the command can be reduced, as well as the time from the completion of an access to one system to the start of an access to next system can be shortened, thereby the data transmission efficiency is enhanced.

According to a seventh aspect of the present invention, there is provided a disc access method for magnetic disc apparatus which can read out or write into various kinds of information data by accessing a magnetic disc employed as a recording medium, wherein when a host apparatus connected externally to the magnetic disc apparatus, performs an access to each of plural systems constituting large capacity successive data, which systems are located apart from each other in the magnetic disc apparatus, the magnetic disc apparatus stores a record of commands at the same time when the host apparatus issues commands for accessing the respective systems to the magnetic disc apparatus, compares a new received command with the stored record of commands to detect continuity of commands against the respective systems every time when it receives a new command issued from the host apparatus, and seeks a magnetic head employed in data access, to a track on the magnetic disc at which data of a system which is supposed to be accessed by the next command locate, without waiting receiving of the next command when the accessing to the data on the magnetic disc at which the respective system data locate.

According to the present invention, by that a seeking of a magnetic head to a track on which data which is supposed to be accesses next exists is carried out at the conclusion of access to data, the time from the receiving of a command to the starting of an access to the requested data while accessing a large capacity successive data on a magnetic disc is reduced, thereby the time from the completion of an access to one system to the starting of an access to the next system is shortened and the data transfer efficiency is enhanced.

According to an eighth aspect of the present invention, there is provided a disc access method for a magnetic disc apparatus which can read out or write into various kinds of information data by accessing a magnetic disc employed as a recording medium, wherein when a host apparatus connected externally to the magnetic disc apparatus, performs an access to each of plural systems constituting large capacity successive data, which systems are located apart from each other in the magnetic disc apparatus, the magnetic disc apparatus stores a record of commands at the same time when the host apparatus issues commands for accessing the respective systems to the magnetic disc apparatus, compares a new received command with the stored record of commands to detect continuity of commands against the respective systems every time when it receives a new command issued from the host apparatus, and performing data access, to a track on the magnetic disc at which data of a system which is supposed to be accessed by the next command locate, without waiting receiving of the next command when the accessing to the data on the magnetic disc at which the respective system data locate.

According to the present invention, by that the data access is started by seeking a magnetic head to a track on which the data which is supposed to be accessed next exists, the time from the receiving of a command to completing the access of the requested data while accessing a large capacity successive data on a magnetic disc is reduced, thereby the time from the completion of an access to one system to the completion of an access to the next system is shortened and the data transfer efficiency is enhanced.

According to a ninth aspect of the present invention, there is provided a disc access method for a magnetic disc apparatus of the seventh aspect or the eighth aspect, which stops seeking of a magnetic head to a track on the magnetic disc, in which the predicted system locates, in a case where a command is issued from the host apparatus and the content of the command is not an access to data of the system that is predicted, during the seeking operation that is being performed in the magnetic disc apparatus before receiving the command from the host apparatus.

According to the present invention, in a case where a command to a supposed system is received during the seeking operation and that command is one which accesses not to the supposed system but to another system, the seeking operation to the supposed system is immediately halted, and it is transited to the interpretation of the received command to initiate an access to the requested system, thereby an increase in the access starting time to the system that is requested by the command even when prediction was erroneously performed.

According to a tenth aspect of the present invention, there is provided a disc access method for a magnetic disc apparatus of the eighth aspect which stops accessing to the data on the magnetic disc in which the supposed system exists, in a case where a command is issued from the host apparatus and the content of the command is not an access to data of the system that is predicted, during the data accessing that is being performed in the magnetic disc apparatus before receiving the command from the host apparatus.

According to the present invention, in a case where a command to a supposed system is received during the seeking operation and that command is one which accesses not to the supposed system but to another system, the accessing to the supposed system is immediately halted, and it is transited to the interpretation of the received command to initiate an access to the requested system, thereby an increase in the access starting time to the system that is requested by the command even when prediction was erroneously performed.

According to an eleventh aspect of the present invention, there is provided a recording medium having recorded a magnetic disc recording apparatus control program, which has recorded a program concerning a disc access method for a magnetic disc apparatus, which apparatus can read out or write into various kinds of information data by accessing a magnetic disc employed as a recording medium, wherein when a host apparatus connected externally to the magnetic disc apparatus, performs an access to each of plural systems constituting large capacity successive data, which systems are located apart from each other in the magnetic disc apparatus, the magnetic disc apparatus stores a record of commands at the same time when the host apparatus issues commands for accessing the respective systems to the magnetic disc apparatus, compares a new received command with the stored record of commands to detect continuity of commands against the respective systems every time when it receives a new command issued from the host apparatus, and preserves location information indicating physical location on the magnetic disc at which data to be accessed for each of the plural systems locate, and in which apparatus a system preserving the location information starts data accessing to the magnetic disc by employing the location information when the magnetic disc apparatus receives a command issued from the host apparatus.

According to the present invention, while accessing large capacity successive data on a magnetic disc, the time required for interpreting a command after receiving the command can be reduced, as well as the time from the completion of an access to one system to the start of an access to next system can be shortened, thereby the data transmission efficiency is enhanced.

According to a twelfth aspect of the present invention, there is provided a recording medium having recorded a magnetic disc apparatus control program, which has recorded a program concerning a disc access method for a magnetic disc apparatus, which apparatus can read out or write into various kinds of information data by accessing a magnetic disc employed as a recording medium, wherein when a host apparatus connected externally to the magnetic disc apparatus, performs an access to each of plural systems constituting large capacity successive data, which systems are located apart from each other in the magnetic disc apparatus, the magnetic disc apparatus stores a record of commands at the same time when the host apparatus issues commands for accessing the respective systems to the magnetic disc apparatus, compares a new received command with the stored record of commands to detect continuity of commands against the respective systems every time when it receives a new command issued from the host apparatus, and seeks a magnetic head employed in data access, to a track on the magnetic disc at which data of a system which is supposed to be accessed by the next command locate, without waiting receiving of the next command when the accessing to the data on the magnetic disc at which the respective system data locate.

According to the present invention, by that a seeking of a magnetic head to a track on which data which is supposed to be accesses next exists is carried out at the conclusion of access to data, the time from the receiving of a command to the starting of an access to the requested data while accessing a large capacity successive data on a magnetic disc is reduced, thereby the time from the completion of an access to one system to the starting of an access to the next system is shortened and the data transfer efficiency is enhanced.

According to a thirteenth aspect of the present invention, there is provided a recording medium having recorded a magnetic disc apparatus control program, which has recorded a program concerning a disc access method for a magnetic disc apparatus, which apparatus can read out or write into various kinds of information data by accessing a magnetic disc employed as a recording medium, wherein when a host apparatus connected externally to the magnetic disc apparatus, performs an access to each of plural systems constituting large capacity successive data, which systems are located apart from each other in the magnetic disc apparatus, the magnetic disc apparatus stores a record of commands at the same time when the host apparatus issues commands for accessing the respective systems to the magnetic disc apparatus, compares a new received command with the stored record of commands to detect continuity of commands against the respective systems every time when it receives a new command issued from the host apparatus, and performing data access, to a track on the magnetic disc at which data of a system which is supposed to be accessed by the next command locate, without waiting receiving of the next command when the accessing to the data on the magnetic disc at which the respective system data locate.

According to the present invention, by that the data access is started by seeking a magnetic head to a track on which the data which is supposed to be accessed next exists, the time from the receiving of a command to completing the access of the requested data while accessing a large capacity successive data on a magnetic disc is reduced, thereby the time from the completion of an access to one system to the completion of an access to the next system is shortened and the data transfer efficiency is enhanced.

According to a fourteenth aspect of the present invention, there is provided a recording medium having recorded a magnetic disc apparatus control program, which has recorded a program concerning a disc access method for a magnetic disc apparatus, of the twelfth aspect or the thirteenth aspect, which stops seeking of a magnetic head to a track on the magnetic disc, in which the predicted system locates, in a case where a command is issued from the host apparatus and the content of the command is not an access to data of the system that is predicted, during the seeking operation that is being performed in the magnetic disc apparatus before receiving the command from the host apparatus.

According to the present invention, in a case where a command to a supposed system is received during the seeking operation and that command is one which accesses not to the supposed system but to another system, the seeking operation to the supposed system is immediately halted, and it is transited to the interpretation of the received command to initiate an access to the requested system, thereby an increase in the access starting time to the system that is requested by the command even when prediction was erroneously performed.

According to a fifteenth aspect of the present invention, there is provided a recording medium having recorded a magnetic disc apparatus control program, which has recorded a program concerning a disc access method for a magnetic disc apparatus, of the thirteenth aspect which stops accessing to the data on the magnetic disc in which the supposed system exists, in a case where a command is issued from the host apparatus and the content of the command is not an access to data of the system that is predicted, during the data accessing that is being performed in the magnetic disc apparatus before receiving the command from the host apparatus.

According to the present invention, in a case where a command to a supposed system is received during the seeking operation and that command is one which accesses not to the supposed system but to another system, the accessing to the supposed system is immediately halted, and it is transited to the interpretation of the received command to initiate an access to the requested system, thereby an increase in the access starting time to the system that is requested by the command even when prediction was erroneously performed.

According to a sixteenth aspect of the present invention, there is provided a magnetic disc apparatus which can read out or write into various kinds of information data by accessing a magnetic disc employed as a recording medium, which comprises: a buffer memory which can store a plurality of data per one command which is transferred between the host apparatus and the magnetic disc apparatus in response to the commands issued from the host apparatus which is connected externally to the magnetic disc apparatus; a read/write control part which performs reading and writing of data from/to the magnetic disc; a command record storing means for storing the record of the command when receiving the command from the host apparatus; a command continuity detecting means for detecting continuity of the received commands from the received commands and the command record in the command record storing means at the receiving of the commands; positional information storing means for storing the positional information indicating the physical position on the magnetic disc at which the data on the magnetic disc exists, to which data the command the continuity of which is detected by the command continuity detecting means accesses; and a control part which performs a seek control to the magnetic head which is used for accessing to the data, and gives a reading instruction and a writing instruction for the data on the magnetic disc to the read/write control part before receiving the command from the host apparatus.

According to the present invention, even for the accesses to the large capacity successive file of plural systems on a magnetic disc, whether the record of commands are stored so that whether the accesses are successive or not is detected, and when the continuity of plural systems are detected, the positional information indicating the physical position on the magnetic disc of the data on the magnetic disc which is accessed for respective systems is held, the system to which next access is requested from the host apparatus is predicted from the command record, and the processing for performing accessing to the data of the predicted system is started before the command is received. Therefore, the time from the completion of an access to one system to the start of an access to the next system is shortened, thereby the data transfer efficiency between the host apparatus and the magnetic disc apparatus is enhanced.

BEST MODE TO EXECUTE THE INVENTION

Hereinafter, embodiments of the present invention will be described with reference to the drawings. The embodiments as described here are only examples, and it is not necessarily limitted to these embodiments.

Embodiment 1

Initially, an example of a magnetic disc apparatus according the present invention will be described as a first embodiment with reference to the drawings.

Figure 1:
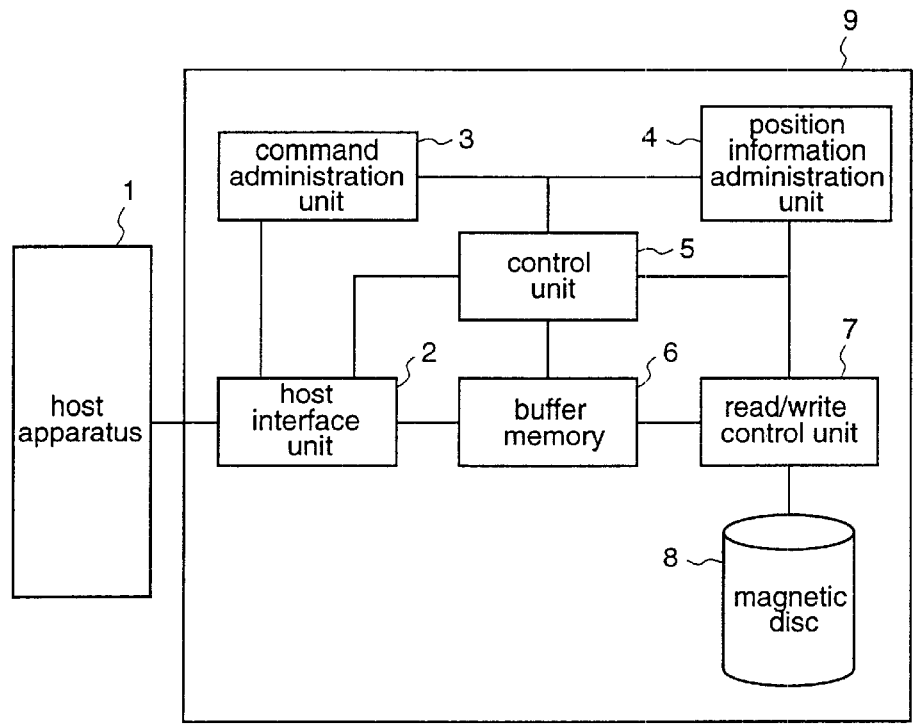
FIG. 1 is a block diagram illustrating the basic construction of a magnetic disc apparatus according to the present invention.

FIG. 1 is a block diagram illustrating the construction of a magnetic disc apparatus 9 according to the embodiment of the present invention. In FIG. 1, the magnetic disc apparatus 9 performs data transmission between a host apparatus 1 on receipt of a command (a data access request) issued from the host apparatus 1.

The magnetic disc apparatus includes a host interface part 2 which controls the interface connected to host apparatus 1 and transmits commands received from the host apparatus 1 to a control section 5, a command administrating part 3 which stores a command and a command parameter transmitted from the host apparatus 1, and a command parameter which is obtained from calculating the received command parameter and indicates a data access starting position, which is issued in the next command, a position information administrating part 4 which compares a newly received command with a record of commands stored in the command control part 3 to detect continuity of received commands every time when it receives a new command from the host apparatus 1, and thereby monitors to which data on the magnetic disc accessing of a command has been performed, and generates and stores the position information (physical cylinder number, head number, and sector number) of data to which accessing is to be performed first at next accessing from the position information of data to which accessing was performed at last, a control part 5 which compares the content of the command administrating part 3 with the received command to detect the presence of continuity of the received command every time when reception of a command is notified from the host interface part 2, and controls the whole operation of the magnetic disc apparatus 9 by employing the position information stored in the position information control part 4 when the continuity of the received command is detected, a buffer memory 6 which temporarily stores data transmitted between the host apparatus 1 and the magnetic disc 8, and a read/write control part 7 which executes reading and writing operation into/from the magnetic disc 8 in response to the instruction from the administrating part 5, and the magnetic disc 8.

Hereinafter, a disc access method according to the magnetic disc apparatus 9 thus constituted will be described with reference to the drawings.

Figure 2:
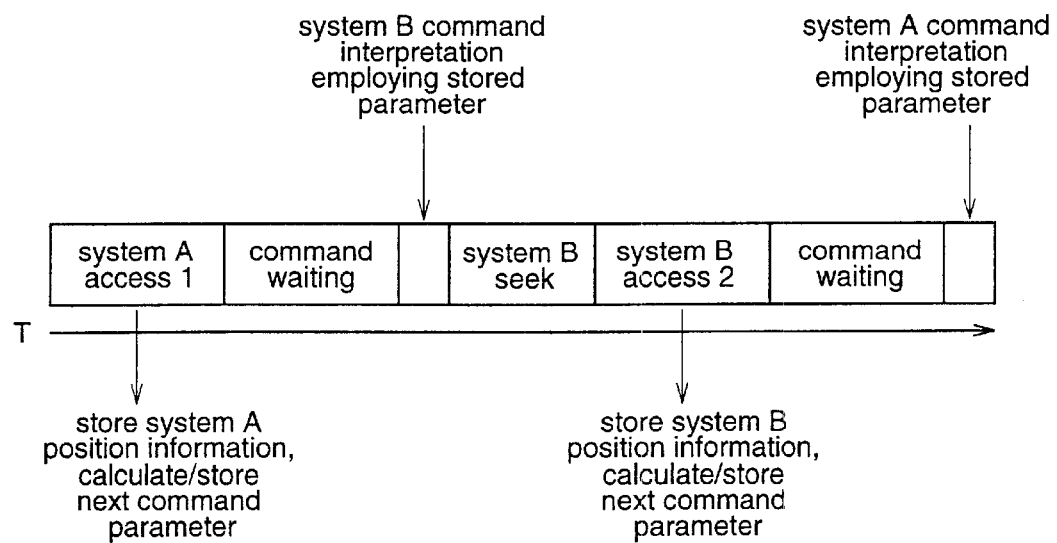
FIG. 2 is an operation diagram in case where accessing is performed simultaneously to two systems of large capacity successive data according to a first embodiment of the present invention.

FIG. 2 is an exemplary diagram illustrating the disc access method according to the magnetic disc apparatus 9 shown in FIG. 1. More particularly, FIG. 2 illustrates the processing carried out in the magnetic disc apparatus 9 when the host apparatus 1 connected to the magnetic disc apparatus 9 performs accesses to the two systems of large capacity successive data (hereinafter referred to as "system A" and "system B") which are located at positions apart from each other in the magnetic disc apparatus 9 simultaneously, in the magnetic disc apparatus 9 shown in FIG. 1.

When the host apparatus 1 accesses simultaneously to two large capacity successive data, the host apparatus 1 issues a command for accessing each file in the large capacity successive data "system A" and a command for accessing each file in the large capacity successive data "system B" alternately at a constant period.

The commands for accessing the large capacity successive data of "system A" and "system B" are stored in the command administrating part 3, and the control part 5 judges from the contents of the commands stored in the command administrating part 3 and the content of the command received from the host apparatus 1, that the command received by the magnetic disc apparatus 9 is one for accessing two systems successive data comprising of "system A" and "system B".

At first, while accessing to the large capacity successive data of system A is carried out during the period of access 1, the position information to be accessed by the next command to the system A is stored in the position information administrating part 4 and the next command parameter to the system A is calculated from the data access starting position and the access data length of the next access to be stored in the command administrating part 3.

After carrying out the access 1 to system A, the magnetic disc apparatus 9 enters a command waiting state until it receives the next command. Subsequently, when it receives the command concerning the access to system B, the command administrating part 3 compares the command parameter at the data access starting position of the received command with the command parameter of the data access starting position which is calculated from the previous command concerning the access to system B and communicates the result to the control section 5.

The operation up to here is described in more detail as follows. The command administrating part 3 calculates, from the received command the continuity whereof is recognized and the command parameters of the data access starting position and the access data length which are given from the host apparatus 1 together with the received command, the command parameter indicating the data access starting position for accessing to that system by the next command and stores the same. This value is obtained as a sum of the data access starting position and the access data length.

The position information administrating part 4 monitors to which data on the magnetic disc the access to the command the continuity whereof is detected has been performed, and calculates the position information of the data which is to be accessed first by the next access from the position information (physical cylinder number, head number, and the sector number) of the data finally accessed and stores the same.

When receiving a command for accessing the large capacity successive data next, the command administrating part 3 compares the data access starting position command parameter of the received command with the data access starting position command parameter which was calculated from the command previously received, and notifies the result to the administrating part 5.

When the comparison results coincide with each other, the control section 5 seeks the magnetic head to a track at which the data exists using the position information which is stored in the position information administrating part 4, and thereafter, instructs the read/write control section 7 to start an access to system B.

Then, while accessing to the large capacity successive data of system B is carried out during the period of access 2, the position information of system B to be accessed by the next command to system B is stored in the position information administrating part 4 and the next command parameter to system B is calculated from the data access starting position and the access data length of the next access to be stored in the command administrating part 3.

In this way, the time from the receiving of the command to the starting of a seek to a track as a target while performing an access to the large capacity successive data on the magnetic track 8 can be reduced.

As a result, it is possible to secure a bandwidth required for the host apparatus 1 with shortening the time required for securing the data transfer capability region for transfer of large capacity successive data on the buffer memory 6 thereby not resulting in reducing the data transfer efficiency between the magnetic disc 8 and the buffer memory 6.

In addition, when a magnetic disc apparatus which can apply the above-described method is constituted, an apparatus that can result the same effects is obtained, and when the above-described method is recorded in a recording medium as a program, a recording medium which has recorded a disc access control program for a magnetic disc apparatus therein and has the same effects can be obtained.

Embodiment 2

Next, a disc access method for a magnetic disc apparatus which is constructed to seek the magnetic head without waiting the next command at completing the data access will be described as a second embodiment with reference to the drawings.

Figure 3:
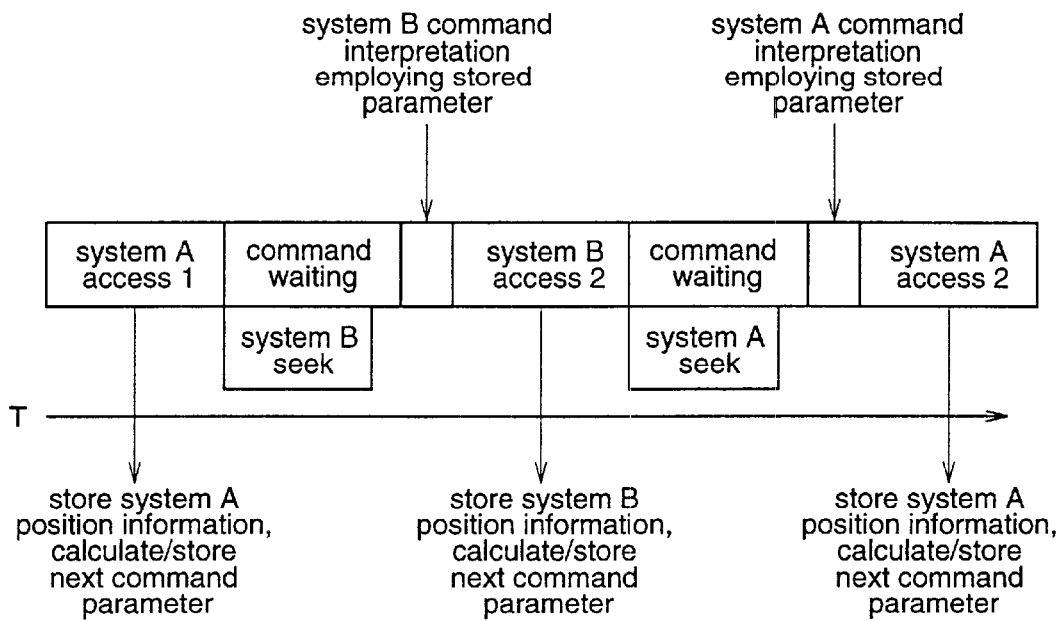
FIG. 3 is an operation diagram in case where accessing is performed simultaneously to two systems of large capacity successive data according to a second embodiment of the present invention.

FIG. 3 is an exemplary diagram illustrating the disc access method according to the magnetic disc apparatus 9 shown in FIG. 1. More particularly, FIG. 3 illustrates the processing carried out in the magnetic disc apparatus 9 when the host apparatus 1 connected to the magnetic disc apparatus 9 is performing accessing to the two systems of large capacity successive data (hereinafter referred to a s "system A" and "system B") which a re located at positions apart from each other in the magnetic disc apparatus 9 simultaneously, in the magnetic disc apparatus 9 shown in FIG. 1.

When the host apparatus 1 accesses simultaneously to two large capacity successive data, the host apparatus 1 issues a command for accessing each file in the large capacity successive data "system A" and a command for accessing each file in the large capacity successive data "system B" alternately at a constant period.

The commands for accessing the large capacity successive data of "system A" and "system B" are stored in the command administrating part 3, and the control part 5 judges from the contents of the commands stored in the command administrating part 3 and the content of the command received from the host apparatus 1, that the command received by the magnetic disc apparatus 9 is one for accessing two systems successive data comprising of "system A" and "system B".

At first, while accessing to the large capacity successive data of system A is carried out during the period of access 1, the position information to be accessed by the next command to the system A is stored in the position information administrating part 4 and the next command parameter to the system A is calculated from the data access starting position and the access data length of the next access to be stored in the command administrating part 3.

While after carrying out the access 1 to system A, the magnetic disc apparatus 9 enters a command waiting state until it receives the next command, the control section 5 predicts the system B as a system to be accessed next, and makes the magnetic head seek the track indicated by the position information of system B which is stored in the position information administrating part 4 (referred as system B seek).

The operation up to here is described in more detail as follows. The command administrating part 3 calculates, from the received command the continuity whereof is recognized and the command parameters of the data access starting position and the access data length which are given from the host apparatus 1 together with the received command, the command parameter indicating the data access starting position for accessing to that system by the next command and stores the same. This value is obtained as a sum of the data access starting position and the access data length.

The position information administrating part 4 monitors to which data on the magnetic disc the access to the command the continuity whereof is detected has been performed, and calculates the position information of the data which is to be accessed first by the next access from the position information (physical cylinder number, head number, and the sector number) of the data finally accessed and stores the same.

When the access to the system in the magnetic disc 8 being performed is completed, the control section 5 predicts the system which is to be accessed next from the command record which is stored in the command administrating part 3 and makes the magnetic head seek the track indicated by the position information of the predicted system which is stored in the position information administrating part 4.

After the completion of the seek operation by the control part 5, when receiving the command for accessing the large capacity successive data, the command administrating part 3 compares the data access starting position command parameter of the received command with the data access starting position command parameter which was calculated from the command previously received, and notifies the result to the administrating part 5.

When the comparison results coincide with each other, the control section 5 instructs the read/write control section 7 to access to a track at which the target data exists using the position information stored in the position information administrating part 4, thereby to start accessing to system B.

Then, while accessing to the large capacity successive data of system B is carried out during the period of access 2, the position information of system B to be accessed by the next command to system B is stored in the position information administrating part 4 and the next command parameter to system B is calculated from the data access starting position and the access data length of the next access to be stored in the command administrating part 3.

While, after completing the access 2 to system B, the magnetic disc apparatus 9 enters the command waiting state, the control part 5 predicts the system A as a system to be accessed next from the command record stored in the command administrating part 3 before receiving the command, and makes the magnetic head seek the track indicated by the position information of the predicted system A which is stored in the position information administrating part 4 (referred as system A seek).

In this way, the time from the receiving of the command to actually starting an access to data when performing accessing to the large capacity successive data on the magnetic track 8 can be reduced.

As a result, it is possible to secure a bandwidth required for the host apparatus 1 with shortening the time required for securing the data transfer capability region for transfer of large capacity successive data on the buffer memory 6 thereby not resulting in reducing the data transfer efficiency between the magnetic disc 8 and the buffer memory 6.

In addition, when a magnetic disc apparatus which can apply the above-described method is constituted, an apparatus that can result the same effects is obtained, and when the above-described method is recorded in a recording medium as a program, a recording medium which has recorded a disc access control program for a magnetic disc apparatus therein and has the same effects can be obtained.

Embodiment 3

Next, a disc access method for a magnetic disc apparatus which is constructed to start accessing to a magnetic disc on which data which is predicted to be accessed by the next command without waiting the next command at completing the data access will be described as a third embodiment with reference to the drawings.

Figure 4:
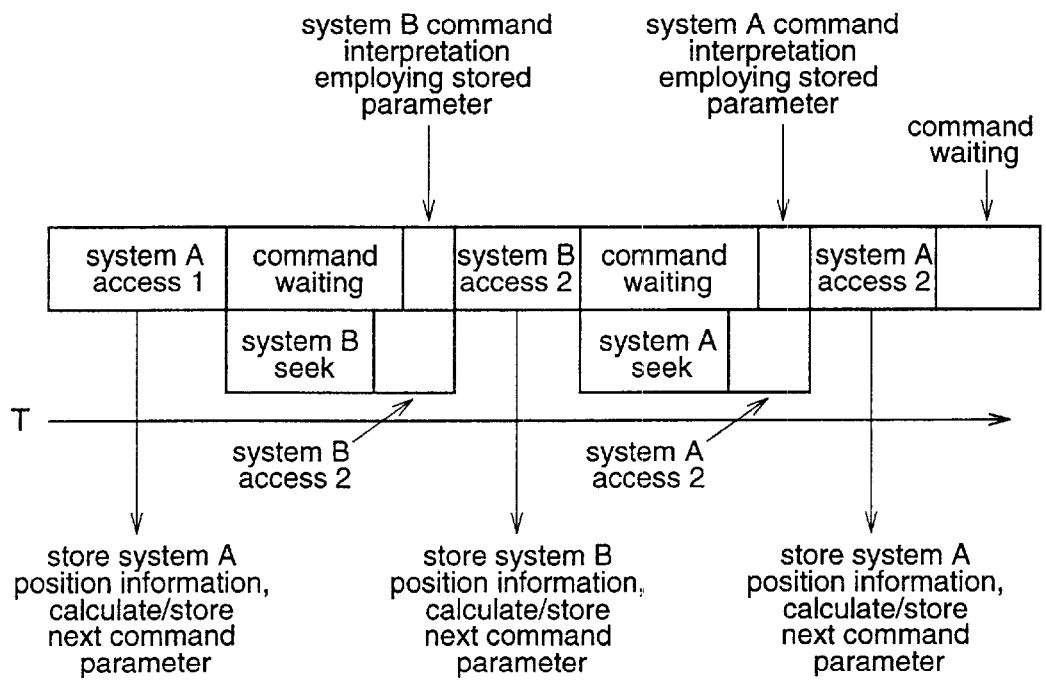
FIG. 4 is an operation diagram in case where accessing is performed simultaneously to two systems of large capacity successive data according to a third embodiment of the present invention.

FIG. 4 is an exemplary diagram illustrating the disc access method according to the magnetic disc apparatus 9 shown in FIG. 1. More particularly, FIG. 4 illustrates the processing carried out in the magnetic disc apparatus 9 when the host apparatus 1 connected to the magnetic disc apparatus 9 is performing accessing to the two systems of large capacity successive data (hereinafter referred to as "system A" and "system B") which are located at positions apart from each other in the magnetic disc apparatus 9 simultaneously, in the magnetic disc apparatus 9 shown in FIG. 1.

When the host apparatus 1 accesses simultaneously to two large capacity successive data, the host apparatus 1 issues a command for accessing each file in the large capacity successive data "system A" and a command for accessing each file in the large capacity successive data "system B" alternately at a constant period.

The commands for accessing the large capacity successive data of "system A" and "system B" are stored in the command administrating part 3, and the control part 5 judges from the contents of the commands stored in the command administrating part 3 and the content of the command received from the host apparatus 1, that the command received by the magnetic disc apparatus 9 is one for accessing two systems successive data comprising of "system A" and "system B".

At first, while accessing to the large capacity successive data of system A is carried out during the period of access 1, the position information to be accessed by the next command to the system A is stored in the position information administrating part 4 and the next command parameter to the system A is calculated from the data access starting position and the access data length of the next access to be stored in the command administrating part 3.

While after carrying out the access 1 to system A, the magnetic disc apparatus 9 enters a command waiting state until it receives the next command, the control section 5 predicts the system B as a system to be accessed next, and makes the magnetic head seek the track indicated by the position information of system B which is stored in the position information administrating part 4 (referred as system B seek). After completing the seeking operation, it instructs the read/write control part 7 to perform accessing to the data indicated by the position information stored in the position information administrating part 4 (referred as system B access 2).

The operation up to here is described in more detail as follows. The command administrating part 3 calculates, from the received command the continuity whereof is recognized and the command parameters of the data access starting position and the access data length which are given from the host apparatus 1 together with the received command, the command parameter indicating the data access starting position for accessing to that system by the next command and stores the same. This value is obtained as a sum of the data access starting position and the access data length.

The position information administrating part 4 monitors to which data on the magnetic disc the access to the command the continuity whereof is detected has been performed, and calculates the position information of the data which is to be accessed first by the next access from the position information (physical cylinder number, head number, and the sector number) of the data finally accessed and stores the same.

When the access to the system in the magnetic disc 8 being performed is completed, the control section 5 predicts the system which is to be accessed next from the command record which is stored in the command administrating part 3 and makes the magnetic head seek the track indicated by the position information of the predicted system which is stored in the position information administrating part 4.

After the completion of the seek operation by the control part 5, it instructs the read/write control part 7 to perform an access to the data indicated by the position information stored in the position information administrating part 4.

When a command for accessing a large capacity successive data is received, the command administrating part 3 compares the data access starting position command parameter of the received command with the data access starting position command parameter which was calculated from the command previously received, and notifies the result to the control section 5.

When the comparison results coincide with each other, the control section 5 instructs the read/write control section 7 to extend the accessing now being performed if the access data length of the received command is larger than the access data length of the access which is now being performed. If the access data length of the received command is shorter than the access data length of the access which is now being performed, it processes the data length of the access data requested by the receiving command as an effective data length and stores the position information of the next data successive to the effective data on the magnetic disc 8. Then, when the accessing oh the requested data length is ended, it instructs the read/write control part 7 to conclude the accessing.

Then, while accessing to the large capacity successive data of system B is carried out during the period of access 2, the position information of system B to be accessed by the next command to system B is stored in the position information administrating part 4 and the next command parameter to system B is calculated from the data access starting position and the access data length of the next access to be stored in the command administrating part 3.

While, after completing the access 2 to system B, the magnetic disc apparatus 9 enters the command waiting state, the control part 5 predicts the system A as a system to be accessed next from the command record stored in the command administrating part 3 before receiving the command, and makes the magnetic head seek the track indicated by the position information of the predicted system A which is stored in the position information administrating part 4 (referred as system A seek). After completing the seeking operation, it instructs the read/write control part 7 to perform accessing to the data indicated by the position information stored in the position information administrating part 4 (referred as system A access 2).

In this way, the time from the receiving of the command to actually concluding the data access when performing accessing to the large capacity successive data on the magnetic track 8 can be reduced.

As a result, it is possible to secure a bandwidth required for the host apparatus 1 with shortening the time required for securing the data transfer capability region for transfer of large capacity successive data on the buffer memory 6 thereby not resulting in reducing the data transfer efficiency between the magnetic disc 8 and the buffer memory 6.

In addition, when a magnetic disc apparatus which can apply the above-described method is constituted, an apparatus that can result the same effects is obtained, and when the above-described method is recorded in a recording medium as a program, a recording medium which has recorded a disc access control program for a magnetic disc apparatus therein and has the same effects can be obtained.

Embodiment 4

Next, a disc access method for a magnetic disc apparatus which is constructed to stop the seek operation when the content of the command which is newly issued is not an access which is previously predicted during the seeking operation in the above-described second and third embodiments will be described as a fourth embodiment with reference to the drawings.

Figure 5:
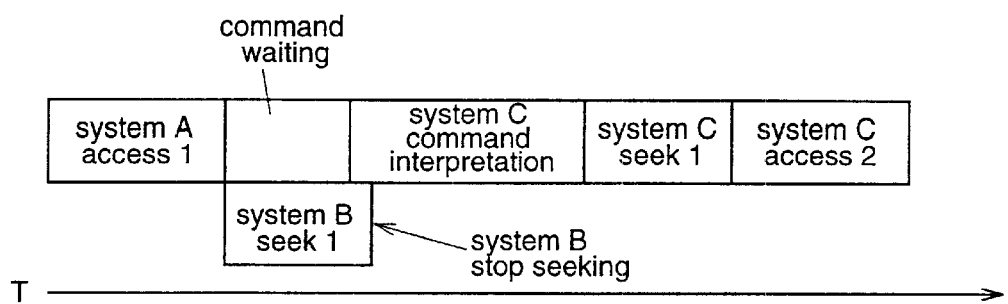
FIG. 5 is an operation diagram in case where accessing is performed simultaneously to two systems of large capacity successive data and the prediction is erroneously performed according to a fourth embodiment of the present invention.

FIG. 5 is an exemplary diagram illustrating the disc access method according to the magnetic disc apparatus 9 shown in FIG. 1. More particularly, FIG. 5 illustrates the processing carried out in the magnetic disc apparatus 9 when the host apparatus 1 connected to the magnetic disc apparatus 9 is performing accessing to the two systems of large capacity successive data (hereinafter referred to as "system A" and "system B") which are located at positions apart from each other in the magnetic disc apparatus 9 simultaneously, in the magnetic disc apparatus 9 shown in FIG. 1.

When the host apparatus 1 accesses simultaneously to two large capacity successive data, the host apparatus 1 issues a command for accessing each file in the large capacity successive data "system A" and a command for accessing each file in the large capacity successive data "system B" alternately at a constant period.

The commands for accessing the large capacity successive data of "system A" and "system B" are stored in the command administrating part 3, and the control part 5 judges from the contents of the commands stored in the command administrating part 3 and the content of the command received from the host apparatus 1, that the command received by the magnetic disc apparatus 9 is one for accessing two systems successive data comprising of "system A" and "system B".

At first, while accessing to the large capacity successive data of system A is carried out during the period of access 1, the position information to be accessed by the next command to the system A is stored in the position information administrating part 4 and the next command parameter to the system A is calculated from the data access starting position and the access data length of the next access to be stored in the command administrating part 3.

While after carrying out the access 1 to system A, the magnetic disc apparatus 9 enters a command waiting state until it receives the next command, the control section 5 predicts the system B as a system to be accessed next, and makes the magnetic head seek the track indicated by the position information of system B which is stored in the position information administrating part 4 (referred as system B seek).

When, while performing a seeking operation to system B, a command for accessing to the large capacity successive data of system C, the command administrating part 3 compares the data access starting position command parameter of the received command with the data access starting position command parameter calculated from the previous command, and notifies the result to the control section 5.

The operation up to here is described in more detail as follows. The command administrating part 3 calculates, from the received command the continuity whereof is recognized and the command parameters of the data access starting position and the access data length which are given from the host apparatus 1 together with the received command, the command parameter indicating the data access starting position for accessing to that system by the next command and stores the same. This value is obtained as a sum of the data access starting position and the access data length.

The position information administrating part 4 monitors to which data on the magnetic disc the access to the command the continuity whereof is detected has been performed, and calculates the position information of the data which is to be accessed first by the next access from the position information (physical cylinder number, head number, and the sector number) of the data finally accessed and stores the same.

When the access to the system in the magnetic disc 8 being performed is completed, the control section 5 predicts the system which is to be accessed next from the command record which is stored in the command administrating part 3 and makes the magnetic head seek the track indicated by the position information of the predicted system which is stored in the position information administrating part 4.

During the seeking operation controlled by the control section 5, when the command for accessing the large capacity successive data is received, the command administrating part 3 compares the data access starting position command parameter of the received command with the data access starting position command parameter which was calculated from the command previously received, and notifies the result to the control section 5.

When the comparison results do not coincide with each other, the control section 5 immediately stops the seeking operation that is now being performed, and starts usual command processing to the received command.

In this way, even when a prediction for a next access is erroneously performed while performing accessing to the large capacity successive data on a magnetic disc 8, an increase in the accessing time can be reduced.

In addition, when a magnetic disc apparatus which can apply the above-described method is constituted, an apparatus that can result the same effects is obtained, and when the above-described method is recorded in a recording medium as a program, a recording medium which has recorded a disc access control program for a magnetic disc apparatus therein and has the same effects can be obtained.

Embodiment 5

Next, a disc access method for a magnetic disc apparatus which is constructed to halt once the data access when the content of the newly issued command is not an access which was previously predicted while performing the data access that is performed in the magnetic disc apparatus in the above-described third embodiment will be described as a fifth embodiment with reference to the drawings.

Figure 6:
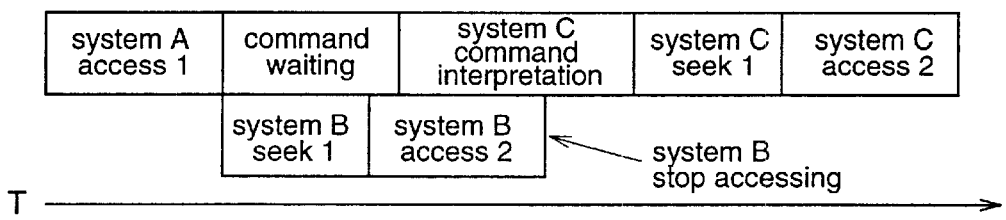
FIG. 6 is an operation diagram in case where accessing is performed simultaneously to two systems of large capacity successive data and the prediction is erroneously performed according to a fifth embodiment of the present invention.
Figure 7:
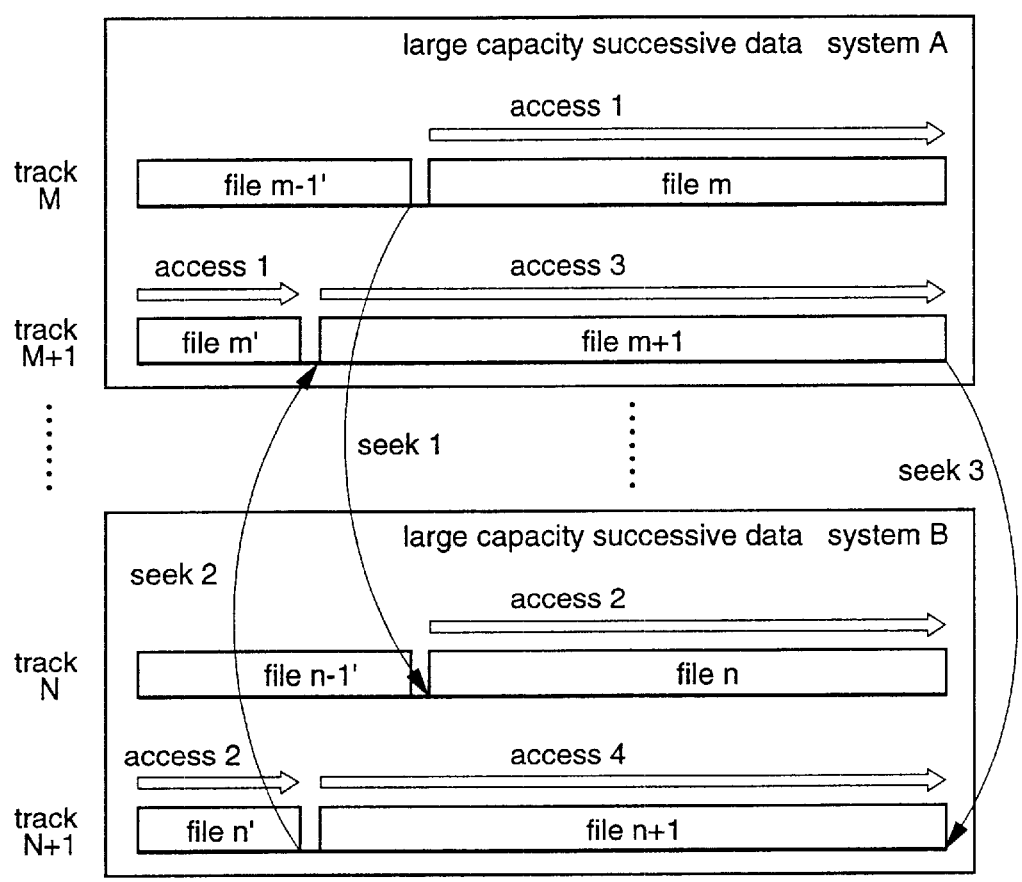
FIG. 7 is an operation diagram in case where accessing is performed simultaneously to two systems of large capacity successive data in a conventional magnetic disc apparatus.
Figure 8:
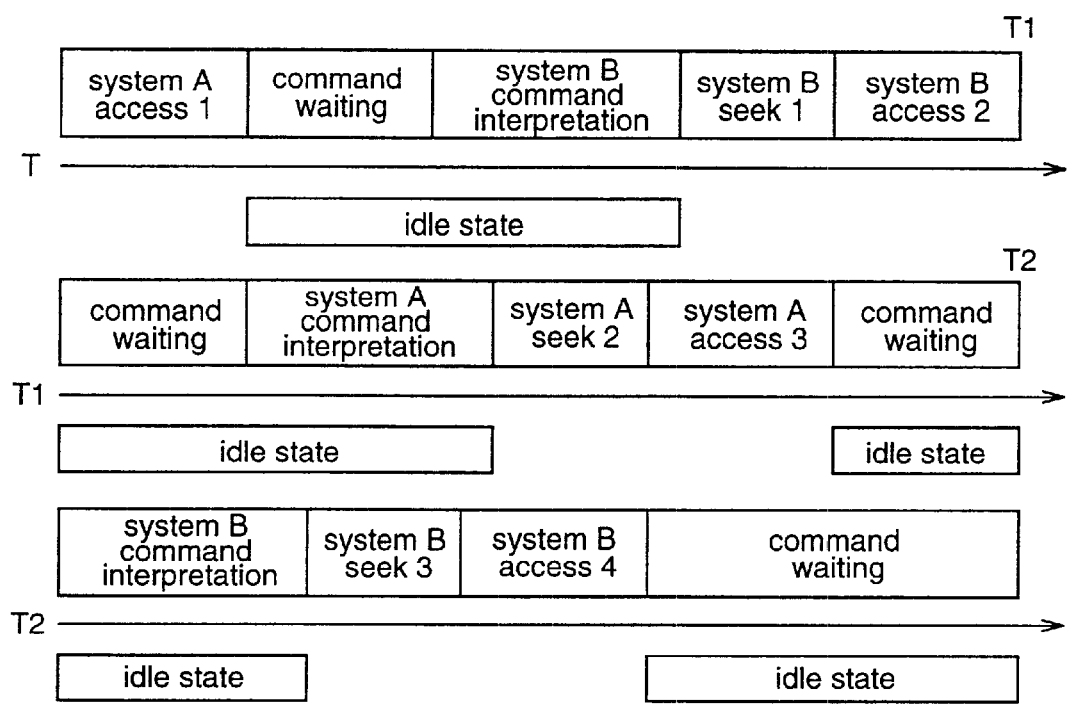
FIG. 8 is a drawing illustrating commands concerning an operation of the conventional magnetic disc apparatus in case where accessing is performed simultaneously to two systems of large capacity successive data.

FIG. 6 is an exemplary diagram illustrating the disc access method according to the magnetic disc apparatus 9 shown in FIG. 1. More particularly, FIG. 6 illustrates the processing carried out in the magnetic disc apparatus 9 when the host apparatus 1 connected to the magnetic disc apparatus 9 is performing accessing to the two systems of large capacity successive data (hereinafter referred to as "system A" and "system B") which are located at positions apart from each other in the magnetic disc apparatus 9 simultaneously, in the magnetic disc apparatus 9 shown in FIG. 1.

When the host apparatus 1 accesses simultaneously to two large capacity successive data, the host apparatus 1 issues a command for accessing each file in the large capacity successive data "system A" and a command for accessing each file in the large capacity successive data "system B" alternately at a constant period.

The commands for accessing the large capacity successive data of "system A" and "system B" are stored in the command administrating part 3, and the control part 5 judges from the contents of the commands stored in the command administrating part 3 and the content of the command received from the host apparatus 1, that the command received by the magnetic disc apparatus 9 is one for accessing two systems successive data comprising of "system A" and "system B".

At first, while accessing to the large capacity successive data of system A is carried out during the period of access 1, the position information to be accessed by the next command to the system A is stored in the position information administrating part 4 and the next command parameter to the system A is calculated from the data access starting position and the access data length of the next access to be stored in the command administrating part 3.

While after carrying out the access 1 to system A, the magnetic disc apparatus 9 enters a command waiting state until it receives the next command, the control section 5 predicts the system B as a system to be accessed next, and makes the magnetic head seek the track indicated by the position information of system B which is stored in the position information administrating part 4 (referred as system B seek). After completing the seeking operation, it instructs the read/write control part 7 to perform accessing to the data indicated by the position information stored in the position information administrating part 4 (referred as system B access 2).

When a command for accessing the large capacity successive data of system C during performing accessing to system B controlled by the read/write control part 7, the command administrating part 3 compares the data access starting position command parameter of the received command with the data access starting position command parameter of the previously received command, and notifies the result to the control section 5.

Then, when the comparison results do not coincide with each other, the control section 5 immediately halts the accessing operation which is now being performed and starts usual command processing to the received command.

In this way, even when a prediction for the next access is erroneously performed while performing an access to the large capacity successive data on the magnetic disc 8, an increase in the accessing time can be avoided.

In addition, when a magnetic disc apparatus which can apply the above-described method is constituted, an apparatus that can result the same effects is obtained, and when the above-described method is recorded in a recording medium as a program, a recording medium which has recorded a disc access control program for a magnetic disc apparatus therein and has the same effects can be obtained.

Applicability In Industry

According to a magnetic disc apparatus, a disc access method for a magnetic disc apparatus, and a recording medium for recording a magnetic disc apparatus disc access control program according to the present invention, even when the access to the large capacity successive data of plural systems is performed, the data transfer efficiency between the magnetic disc and the buffer memory can be enhanced, being appropriate for such as a large capacity memory apparatus of a computer system controlling and administrating the OA apparatuses or industrial apparatuses.

What is claimed is:

1. A magnetic disc apparatus which can read out or write into various kinds of information data by accessing a magnetic disc employed as a recording medium, wherein
when a host apparatus connected externally to the magnetic disc apparatus, performs an access to each of plural systems constituting large capacity successive data, which systems are located apart from each other in the magnetic disc apparatus,
the magnetic disc apparatus stores a record of commands at the same time when the host apparatus issues commands for accessing the respective systems to the magnetic disc apparatus,
compares a new received command with the stored record of commands to detect continuity of commands against the respective systems every time when it receives a new command issued from the host apparatus, and
preserves location information indicating physical location on the magnetic disc at which data to be accessed for each of the plural systems locate, and in which a magnetic disc apparatus,
a system preserving the location information starts data accessing to the magnetic disc by employing the location information when the magnetic disc apparatus receives a command issued from the host apparatus.

2. A magnetic disc apparatus which can read out or write into various kinds of information data by accessing a magnetic disc employed as a recording medium, wherein
when a host apparatus connected externally to the magnetic disc apparatus, performs an access to each of plural systems constituting large capacity successive data, which systems are located apart from each other in the magnetic disc apparatus,
the magnetic disc apparatus stores a record of commands at the same time when the host apparatus issues commands for accessing the respective systems to the magnetic disc apparatus,
compares a new received command with the stored record of commands to detect continuity of commands against the respective systems every time when it receives a new command issued from the host apparatus, and
seeks a magnetic head employed in data access, to a track on the magnetic disc at which data of a system which is supposed to be accessed by the next command locate, without waiting receiving of the next command when the host apparatus the data on the magnetic disc at which the respective system data locate.

3. A magnetic disc apparatus which can read out or write into various kinds of information data by accessing a magnetic disc employed as a recording medium, wherein
when a host apparatus connected externally to the magnetic disc apparatus, performs an access to each of plural systems constituting large capacity successive data, which systems are located apart from each other in the magnetic disc apparatus,
the magnetic disc apparatus stores a record of commands at the same time when the host apparatus issues commands for accessing the respective systems to the magnetic disc apparatus,
compares a new received command with the stored record of commands to detect continuity of commands against the respective systems every time when it receives a new command issued from the host apparatus, and
performs data access, to a track on the magnetic disc at which data of a system which is supposed to be accessed by the next command locate, without waiting receiving of the next command when the host apparus accesses the data on the magnetic disc at which the respective system data locate.

4. A magnetic disc apparatus as defined in claim 2, which stops seeking of a magnetic head to a track on the magnetic disc, in which the predicted system locates, in a case where a command is issued from the host apparatus and the content of the command is not an access to data of the system that is predicted, during the seeking operation that is being performed in the magnetic disc apparatus before receiving the command from the host apparatus.

5. A magnetic disc apparatus as defined in claim 3, which stops accessing to the data on the magnetic disc in which the supposed system exists, in a case where a command is issued from the host apparatus and the content of the command is not an access to data of the system that is predicted, during the data accessing that is being performed in the magnetic disc apparatus before receiving the command from the host apparatus.

6. A disc access method for a magnetic disc apparatus which apparatus can read out or write into various kinds of information data by accessing a magnetic disc employed as a recording medium, wherein
when a host apparatus connected externally to the magnetic disc apparatus, performs an access to each of plural systems constituting large capacity successive data, which systems are located apart from each other in the magnetic disc apparatus,
the magnetic disc apparatus stores a record of commands at the same time when the host apparatus issues commands for accessing the respective systems to the magnetic disc apparatus,
compares a new received command with the stored record of commands to detect continuity of commands against the respective systems every time when it receives a new command issued from the host apparatus, and
preserves location information indicating physical location on the magnetic disc at which data to be accessed for each of the plural systems locate, and in which a magnetic disc apparatus,
a system preserving the location information starts data accessing to the magnetic disc by employing the location information when the magnetic disc apparatus receives a command issued from the host apparatus.

7. A disc access method for magnetic disc apparatus which can read out or write into various kinds of information data by accessing a magnetic disc employed as a recording medium, wherein when a host apparatus connected externally to the magnetic disc apparatus, performs an access to each of plural systems constituting large capacity successive data, which systems are located apart from each other in the magnetic disc apparatus, the magnetic disc apparatus stores a record of commands at the same time when the host apparatus issues commands for accessing the respective systems to the magnetic disc apparatus, compares a new received command with the stored record of commands to detect continuity of commands against the respective systems every time when it receives a new command issued from the host apparatus, and seeks a magnetic head employed in data access, to a track on the magnetic disc at which data of a system which is supposed to be accessed by the next command locate, without waiting receiving of the next command when the host appartus accesses the data on the magnetic disc at which the respective system data locate.

8. A disc access method for a magnetic disc apparatus which can read out or write into various kinds of information data by accessing a magnetic disc employed as a recording medium, wherein when a host apparatus connected externally to the magnetic disc apparatus, performs an access to each of plural systems constituting large capacity successive data, which systems are located apart from each other in the magnetic disc apparatus, the magnetic disc apparatus stores a record of commands at the same time when the host apparatus issues commands for accessing the respective systems to the magnetic disc apparatus, compares a new received command with the stored record of commands to detect continuity of commands against the respective systems every time when it receives a new command issued from the host apparatus, and performs data access, to a track on the magnetic disc at which data of a system which is supposed to be accessed by the next command locate, without waiting receiving of the next command when the host apparatus accesses the data on the magnetic disc at which the respective system data locate.

9. A disc access method as defined in claim 7, which stops seeking of a magnetic head to a track on the magnetic disc, in which the predicted system locates, in a case where a command is issued from the host apparatus and the content of the command is not an access to data of the system that is predicted, during the seeking operation that is being performed in the magnetic disc apparatus before receiving the command from the host apparatus.

10. A disc access method for a magnetic disc apparatus as defined in claim 8, which stops accessing to the data on the magnetic disc in which the supposed system exists, in a case where a command is issued from the host apparatus and the content of the command is not an access to data of the system that is predicted, during the data accessing that is being performed in the magnetic disc apparatus before receiving the command from the host apparatus.

11. A recording medium having recorded a magnetic disc recording apparatus control program, which has recorded a program concerning a disc access method for a magnetic disc apparatus, which apparatus can read out or write into various kinds of information data by accessing a magnetic disc employed as a recording medium, wherein when a host apparatus connected externally to the magnetic disc apparatus, performs an access to each of plural systems constituting large capacity successive data, which systems are located apart from each other in the magnetic disc apparatus, the magnetic disc apparatus stores a record of commands at the same time when the host apparatus issues commands for accessing the respective systems to the magnetic disc apparatus, compares a new received command with the stored record of commands to detect continuity of commands against the respective systems every time when it receives a new command issued from the host apparatus, and in which a magnetic disc apparatus, preserves location information indicating physical location on the magnetic disc at which data to be accessed for each of the plural systems locate, and in which a magnetic disc apparatus, a system preserving the location information starts data accessing to the magnetic disc by employing the location information when the magnetic disc apparatus receives a command issued from the host apparatus.

12. A recording medium having recorded a magnetic disc apparatus control program, which has recorded a program concerning a disc access method for a magnetic disc apparatus, which apparatus can read out or write into various kinds of information data by accessing a magnetic disc employed as a recording medium, wherein when a host apparatus connected externally to the magnetic disc apparatus, performs an access to each of plural systems constituting large capacity successive data, which systems are located apart from each other in the magnetic disc apparatus, the magnetic disc apparatus stores a record of commands at the same time when the host apparatus issues commands for accessing the respective systems to the magnetic disc apparatus, compares a new received command with the stored record of commands to detect continuity of commands against the respective systems every time when it receives a new command issued from the host apparatus, and seeks a magnetic head employed in data access, to a track on the magnetic disc at which data of a system which is supposed to be accessed by the next command locate, without waiting receiving of the next command when the host apparatus accesses the data on the magnetic disc at which the respective system data locate.

13. A recording medium having recorded a magnetic disc apparatus control program, which has recorded a program concerning a disc access method for a magnetic disc apparatus, which apparatus can read out or write into various kinds of information data by accessing a magnetic disc employed as a recording medium, wherein when a host apparatus connected externally to the magnetic disc apparatus, performs an access to each of plural systems constituting large capacity successive data, which systems are located apart from each other in the magnetic disc apparatus, the magnetic disc apparatus stores a record of commands at the same time when the host apparatus issues commands for accessing the respective systems to the magnetic disc apparatus, compares a new received command with the stored record of commands to detect continuity of commands against the respective systems every time when it receives a new command issued from the host apparatus, and performs data access, to a track on the magnetic disc at which data of a system which is supposed to be accessed by the next command locate, without waiting receiving of the next command when the host apparatus accesses the data on the magnetic disc at which the respective system data locate.

14. A recording medium having recorded a magnetic disc apparatus control program, which has recorded a program concerning a disc access method for a magnetic disc apparatus, of claim 12, which stops seeking of a magnetic head to a track on the magnetic disc, in which the predicted system locates, in a case where a command is issued from the host apparatus and the content of the command is not an access to data of the system that is predicted, during the seeking operation that is being performed in the magnetic disc apparatus before receiving the command from the host apparatus.

15. A recording medium having recorded a magnetic disc apparatus control program, which has recorded a program concerning a disc access method for a magnetic disc apparatus, of claim 13, which stops accessing to the data on the magnetic disc in which the supposed system exists, in a case where a command is issued from the host apparatus and the content of the command is not an access to data of the system that is predicted, during the data accessing that is being performed in the magnetic disc apparatus before receiving the command from the host apparatus.

16. A magnetic disc apparatus which can read out or write into various kinds of information data by accessing a magnetic disc employed as a recording medium, which comprises:

a buffer memory which can store a plurality of data per one command which is transferred between the host apparatus and the magnetic disc apparatus in response to the commands issued from the host apparatus which is connected externally to the magnetic disc apparatus;

a read/write control part which performs reading and writing of data from/to the magnetic disc;

a command record storing means for storing the record of the command when receiving the command from the host apparatus;

a command continuity detecting means for detecting continuity of the received commands from the host apparatus and the command record in the command record storing means at the receiving of the commands;

positional information storing means for storing the positional information indicating the physical position on the magnetic disc at which the data on the magnetic disc exists, to which data the command the continuity of which is detected by the command continuity detecting means accesses; and a control part which performs a seek control to the magnetic head which is used for accessing to the data, and gives a reading instruction and a writing instruction for the data on the magnetic disc to the read/write control part before receiving the command from the host apparatus.

17. A magnetic disc apparatus as defined in claim 3, which stops seeking of a magnetic head to a track on the magnetic disc, in which the predicted system locates, in a case where a command is issued from the host apparatus and the content of the command is not an access to data of the system that is predicted, during the seeking operation that is being performed in the magnetic disc apparatus before receiving the command from the host apparatus.

18. A disc access method as defined in claim 8, which stops seeking of a magnetic head to a track on the magnetic disc, in which the predicted system locates, in a case where a command is issued from the host apparatus and the content of the command is not an access to data of the system that is predicted, during the seeking operation that is being performed in the magnetic disc apparatus before receiving the command from the host apparatus.

19. A recording medium having recorded a magnetic disc apparatus control program, which has recorded a program concerning a disc access method for a magnetic disc apparatus, of claim 13, which stops seeking of a magnetic head to a track on the magnetic disc, in which the predicted system locates, in a case where a command is issued from the host apparatus and the content of the command is not an access to data of the system that is predicted, during the seeking operation that is being performed in the magnetic disc apparatus before receiving the command from the host apparatus.

* * * * *